Nov. 23, 1965     J. R. GREINER     3,218,784
HAMMOCK FILTER
Filed April 1, 1963     2 Sheets-Sheet 1
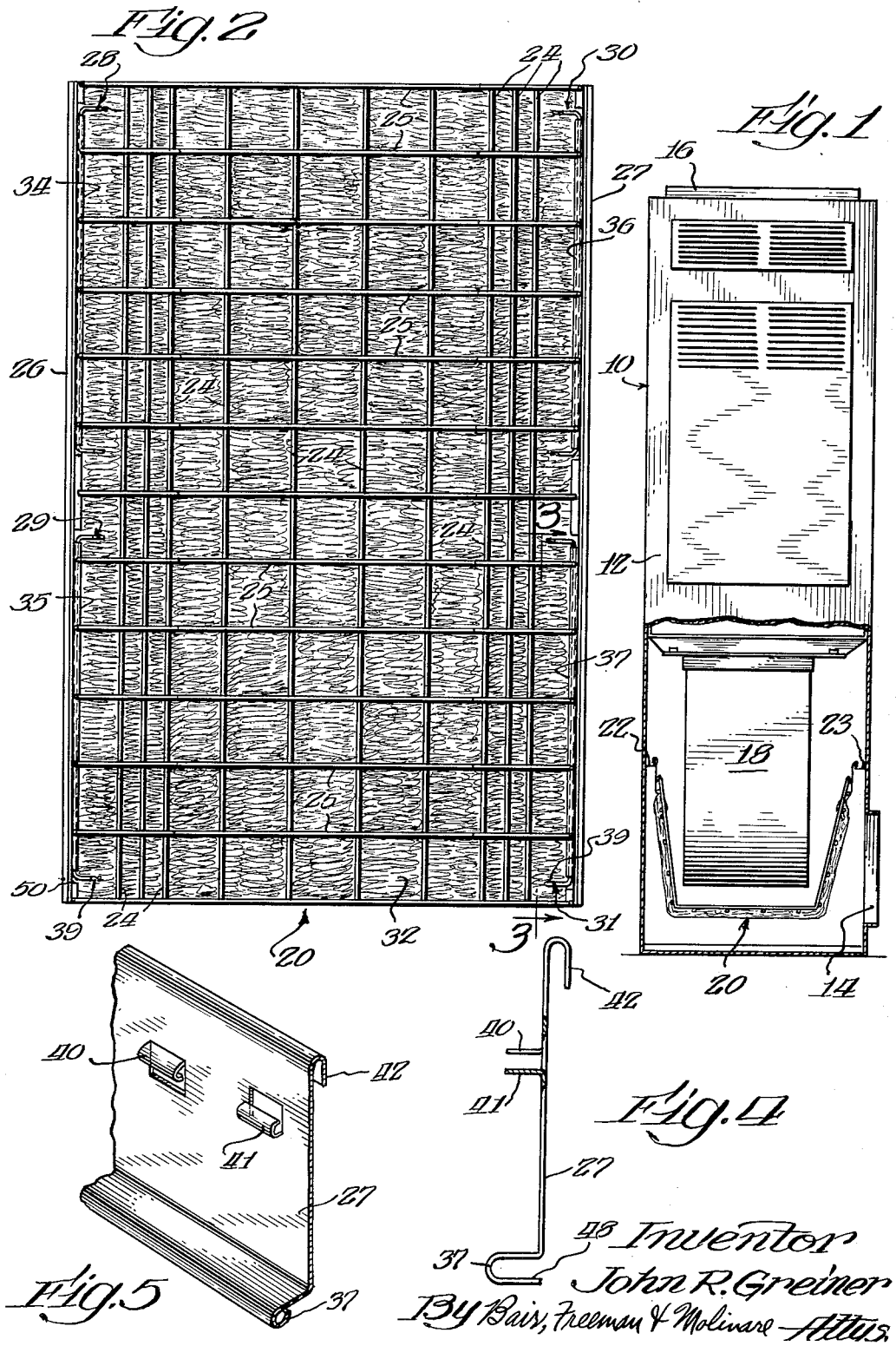
Inventor
John R. Greiner
By Bair, Freeman & Molinare Attys

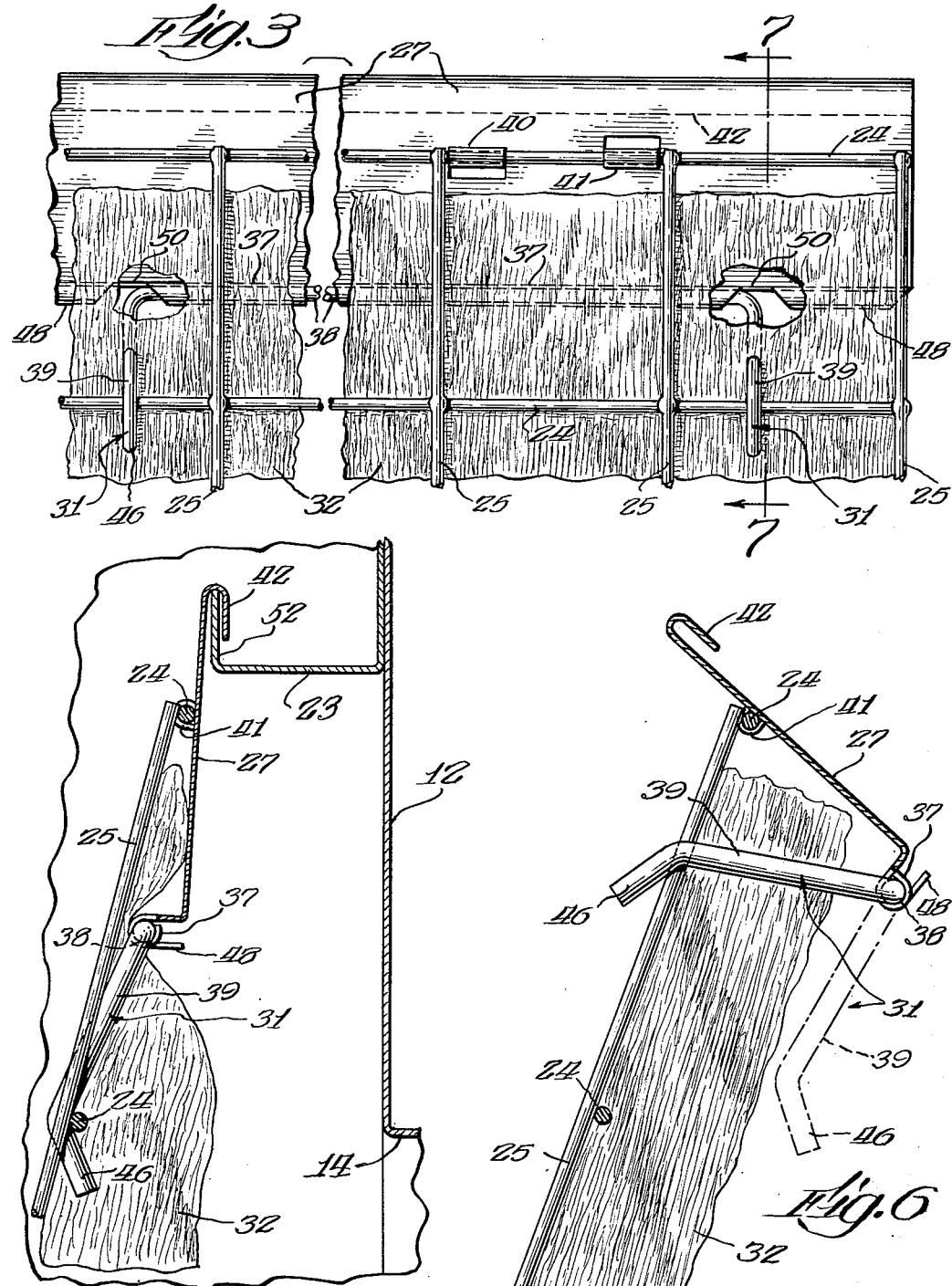

United States Patent Office 3,218,784
Patented Nov. 23, 1965

3,218,784
HAMMOCK FILTER
John R. Greiner, Marshalltown, Iowa, assignor to Lennox Industries Inc., a corporation of Iowa
Filed Apr. 1, 1963, Ser. No. 269,521
5 Claims. (Cl. 55—491)

This invention relates to an improved hammock type filter construction and, more particularly, to a novel arcuately-shaped wire frame structure for supporting a flexible, fibrous filter material in an air processing unit.

Efficient and reliable air filtration is of great importance in the operation of air processing equipment for heating, cooling and ventilating systems. The continuous fiber type of throw-away filter mat has been widely adopted for use in blower installations in such air processing equipment. One of the primary requirements of such filter mat is that it be readily replaceable and easily serviced. Such filter mat, however, is inherently fragile and non-rigid and necessarily requires a supporting structure or frame. Although various mounting structures and frames utilizing throw-away filter materials have been suggested in the past wherein the frame is reusable upon replacement of the filter material, there has been a need for improving such structures to facilitate faster and easier filter replacement.

A primary object of the present invention, therefore, is to provide a filter assembly for continuous fiber type or throw-away filter materials wherein the filter material may be readily and quickly replaced.

It is another object of this invention to provide a filter assembly having a wire frame structure adapted to be removably mounted at the inlet side of an airblower in an air processing unit, the wire frame structure having end pieces or flanges pivoted on opposite ends thereof, and hook means on the pivoted flanges for engaging and positively retaining a pad of continuous fiber type filter material.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing wherein like numerals refer to like elements and in which:

FIGURE 1 is a front elevational view of an air processing unit partially broken away to illustrate the improved hammock filter assembly of the present invention mounted in operative relation therein;

FIGURE 2 is a plan view of the filter assembly embodying the principles and features of this invention;

FIGURE 3 is a detail view on an enlarged scale of the filter assembly taken generally along line 3—3 of FIGURE 2;

FIGURE 4 is a detail view of an end piece of the filter assembly prior to forming of the hinge means thereon for securing the end piece to the wire frame structure of the filter assembly;

FIGURE 5 is a detail perspective view of an end piece of the filter assembly after forming of the hinge means for securing the end piece to the wire grid structure, with the hook means being omitted for clarity;

FIGURE 6 is a side detail view of the filter assembly illustrating the manner of securing the filter material to the supporting structure of the filter assembly; and FIGURE 7 is an enlarged detail view illustrating the connection of the filter assembly to a rail member in the air processing unit, taken generally along line 7—7 of FIGURE 3.

Referring now more particularly to the drawing, there is illustrated an air processing unit 10 of a type in which the filter assembly of the present invention may be utilized. The unit 10 may comrpise a conventional furnace assembly having a burner construction therein. The unit 10 comprises a cabinet frame structure 12 having an inlet opening 14 defined in a lower portion thereof and communicating with the return air duct in the home or building in which the air processing unit is used. At the top of the air processing unit there is provided an outlet opening 16 which communicates with the forced air ducts supplying air from the furnace to the area to be treated or conditioned. Supported within the frame structure 12 is a blower unit 18 of conventional design.

Disposed beneath the blower unit 18 at the upstream side of the blower unit 18 relative to the normal path of air flow through the unit 10 is the filter means or filter assembly 20 of the present invention. The filter assembly 20 is supported on rail or support members 22 and 23 which are affixed to opposite side walls of the frame structure 12. It will be noted that the filter assembly defines a generally arcuate and concave supporting means adapted to surround and enclose a substantial portion of the blower unit 18. The particular concave geometry may vary as desired in accordance with the corresponding geometry of the adjacent blower unit and thus reference hereinafter will be made to all such shapes and forms by use of the term "generally arcuate."

Turning now to FIGURE 2, it is seen that the filter assembly comprises a wire grid or mesh formed from a plurality of crossed wires 24 and 25. The crossed wires are suitably affixed at their junctures, as for example, by welding.

Affixed to the non-arcuate ends of the wire rack are elongated plate-like end pieces 26 and 27. Pivotally secured to the end pieces 26 and 27 are a plurality of locking members or hook members 28, 29, 30 and 31 for securing the filter media 32 in place on the wire rack. The filter media may comprise a mat of continuous glass fibers coated with a suitable viscous material such as oil to improve filtration efficiency. However, it will be appreciated by those skilled in the art that other filter media having similar mechanical strength and manual handling properties may be utilized.

The U-shaped locking members 28, 29, 30 and 31 which secure the filter media to the wire rack are pivotally connected to the end pieces 26 and 27 by hinge means defined on the end pieces. Such hinge means comprise bent-over portions 34, 35, 36 and 37 defined on the end pieces 26 and 27. Each U-shaped member is comprised of a base retained within the flanges 34, 35, 36 and 37, respectively, and a pair of arms which are adapted to extend through the filter media for securing the same positively in place.

Turning now to FIGURE 3, there is illustrated an enlarged detail view of the filter assembly shown in FIGURES 1 and 2. The end piece 27 is pivotally secured to the wire 24 forming the end wire of the wire rack by hinge means comprising lugs 40 and 41, respectively. The lugs are stamped or struck out from the central portion of the end piece 27 and are then bent over coaxially with one another so as to define the support for the wire 24. As indicated in FIGURE 3, the wire locking member 31 comprises a base 38 which is pivotally affixed by the flange 37 to the end piece 27, and a pair of arms 39 which extend through the filter media for securing the filter media 32 in place on the wire rack. It will be understood that the other locking members are similarly fabricated and are similarly connected to the respective end pieces.

Referring now to FIGURES 4 and 5, there are illustrated detail views of an end piece prior to forming of the hinge means defined by lugs or projections 40 and 41 and after forming of the hinge means defined by the lugs 40 and 41. It is seen that initially the lugs 40 and 41, respectively, are stamped from the end piece 27 so as to extend transversely to the central portion thereof. The upper lug 40 is then turned downwardly about the wire 24, which was omitted for purposes of clarity, so as to grasp the same and, similarly, the lug 41 is turned upwardly about the wire member 24.

The top of the end piece may be bent over to define a flange 42 as indicated in FIGURES 4 and 5, which flange is utilized to engage a rail support member in the furnace for supporting the filter assembly in position. The flange 36 at the bottom of the end piece is discontinuous and portions thereof are bent over the base 38 of the U-shaped member for the purpose of pivotally securing the U-shaped member to the bottom of the end piece 27, as is indicated in FIGURES 3, 5 and 6.

The manner of securing the filter media in place on the filter assembly is illustrated in FIGURE 6. Initially, the end piece 27 is pivoted about the longitudinal axis extending through the end wire member 24 away from the wire rack or counterclockwise as viewed in FIGURE 6. The U-shaped member 31 is pivoted about an axis extending through the base 38 of the U-shaped member so as to be in position to receive the filter media. The filter mat 32, which is substantially coextensive with the rack, is positioned on the wire rack. The U-shaped members 30 and 31 on the end piece 27 are then pivoted about the axis defined through the base 38 of the U-shaped members so as to extend through the filter mat 32. The end piece is then pivoted clockwise as viewed in FIGURE 6 about the axis defined through wire member 24 forming the end of the wire rack so as to bear lightly upon the filter media 32. Then the arms 39 of the U-shaped members are pivoted counterclockwise about the axis extending through the base 38 of the U-shaped members into close proximity with the wire member 24 next away from the endmost wire member.

FIGURE 7 illustrates the position of the components of the filter assembly after the components are in final assembled position. It is seen that the filter mat 32 is partially compressed by the lower portion of the end piece 27 which is in close proximity to the wire rack and further that the end of the filter mat is positively retained by the arms 39 of the U-shaped members which extend therethrough and then are rotated toward the wire member 24 next removed from the end wire member.

As more clearly seen in FIGURES 6 and 7, the ends of the arms 39 are bent as indicated generally at 46 to facilitate passing through the filter media and also facilitate gripping of the arms on the wire member 24 next adjacent the end wire member.

The flange 36 at the bottom of the end piece 27 includes a bent over portion engaging the base 38 of the U-shaped members and a straight portion 48. As indicated generally at 50 in FIGURE 3, portions of the flange are cut out so as to permit bending of certain portions of flange 36 to define the hinge means for securing the U-shaped members to the bottom of the end pieces.

As seen more clearly in FIGURE 7, the end rail 23 has an upwardly turned portion 52 for engaging the hook or flange 42 at the top of the end piece 27. The end piece 27 wil be engaged with the rail or support member 23 and similarly the end piece 26 will be engaged with the rail or support member 22 to support the filter assembly in position beneath the blower unit 18.

It will be appreciated that the filter rack assembly of the present invention may be utilized in a convex manner in certain type of furnace installations and may also be utilized in a manner so as to be concave to the right or concave to the left as viewed in FIGURE 1 in other furnace applications.

From the foregoing it is seen that the filter mat 32 is positively retained in the filter assembly 20 and will conform to the arcuately concave form of the supporting wire rack. The filter mat may be easily and conveniently removed from the wire rack for replacement.

While there has been shown and described a particular embodiment of this invention, it wil be obvious to those skilled in the art that various changes and modifications may be made herein without departing from the invention and therefore it is intended in the appended claims to cover all such changes and modifications as fall within the true spirit and scope of the invention.

What I claim as new and desire to secure by Letters Patent of the United States:

1. For use in an air processing unit having a housing and a blower mounted therein, a generally arcuate-shaped filter assembly adapted to be mounted in the stream of air passing through the housing, said filter assembly comprising a wire mesh supporting rack, filter material substantially coextensive with said wire mesh supporting rack and adapted to be secured thereto, a pair of flange members pivotally secured to the non-arcuate ends of said wire mesh supporting rack for engaging the ends of said filter material, and hook means pivotally secured at one end to each of said flange members and having a free end for engaging and positively retaining said filter material in place on said wire mesh supporting rack, the pivotal connection of said hook means to said flange members being spaced from the pivotal connection of said flange members to said supporting rack, each of said flange members having means formed thereon for engaging a support member in the air processing unit and supporting the filter assembly in position within the air processing unit.

2. In an air processing unit, the combination of a generally arcuate-shaped filter assembly comprising a wire rack, a filter pad substantially coextensive with said wire rack, a pair of elongated flange members pivotally secured to the non-arcuate ends of said wire rack for engaging the ends of said filter pad to secure the same to the wire rack, and hook means pivotally secured to an end of each of said flange members for engaging and positively retaining said filter pad in place on said wire rack, said flange members each having struck-out portions bent over to define hinge means for pivotally securing said wire rack to said flange member, said hinge means being spaced from the pivotal connections of the flange members to said wire rack, said flange members each having means formed thereon for engaging with a support in the air processing unit for supporting the filter assembly in position therein.

3. In an air processing unit, a filter assembly comprising the combination of an arcuate wire supporting rack, a pad of flexible, filter material extending substantially coextensive with said wire supporting rack, and means for securing said pad to said wire supporting rack comprising a pair of flange members pivotally secured to the non-arcuate ends of the wire supporting rack for engaging adjacent ends of said pad, said flange members each having struck-out portions intermediate the ends thereof bent over to define hinge means, hook means engaging said hinge means and being pivotally secured to an end of each of said flange members for engaging and positively retaining said pad in place on said wire supporting rack, said hook members comprising an elongated base and a pair of arms extending transversely therefrom, said base being pivotally engaged with said flange member and the free ends of said arms being adapted to engage and secure said pad in position, each of said flange members having means formed on an end thereof for engaging with a support in the air processing unit for supporting the filter assembly within the air processing unit.

4. A hammock type filter assembly adapted to be removably mounted at the inlet side of an air blower, said assembly comprising a generally arcuate supporting rack of wire mesh providing a substantially rigid but resiliently deformable supporting means characterized by substantially free air flow therethrough, said supporting rack having its concave side adapted to be oriented toward the inlet side of an air blower, a mat of flexible filter material substantially coextensive with said rack and extending transversely across said supporting rack at the upstream air-flow side thereof, flange means pivotally mounted at opposite ends of said supporting rack for engaging the ends of said mat and retaining said continuous mat on said supporting rack, and hook means on said flange means for penetrating said mat and positively retaining said mat on said supporting rack, said hook means being pivoted on said flange means at locations spaced from the pivotal connection of said flange means on said supporting rack.

5. A hammock type filter assembly adapted to be removably mounted at the inlet side of an air blower, said assembly comprising a generally arcuate supporting rack of wire mesh providing a substantially rigid but resiliently deformable supporting means characterized by substantially free air flow therethrough, said rack having its concave side adapted to be oriented toward the inlet side of an air blower, flange means extending transversely fully across said rack at each of the opposite ends of said rack and being pivotally connected to said rack for providing gripping jaws for engaging the ends of a mat of flexible filter material extending transversely fully across said rack at the upstream air-flow side thereof, and hook means piovtally carried on said flange means and extending through said mat and thereby positively retaining said mat on said rack when said flange means is in a first closed position and whereby when said flange means is in a second opened position said mat may be readily released from said hook means and replaced.

References Cited by the Examiner
UNITED STATES PATENTS

| | | | |
|---|---|---|---|
| 2,182,501 | 12/1939 | Quave et al. | 55—491 |
| 2,408,158 | 9/1946 | Belsher | 55—491 |
| 2,771,963 | 11/1956 | Eichorn | 55—502 |
| 2,850,269 | 9/1958 | Bohanon | 55—491 X |
| 3,034,772 | 5/1962 | Schulz | 55—500 X |

ROBERT F. BURNETT, *Primary Examiner.*

HARRY B. THORNTON, *Examiner.*